(No Model.)
J. CUNNINGHAM.
NUT LOCK.
No. 325,397. Patented Sept. 1, 1885.
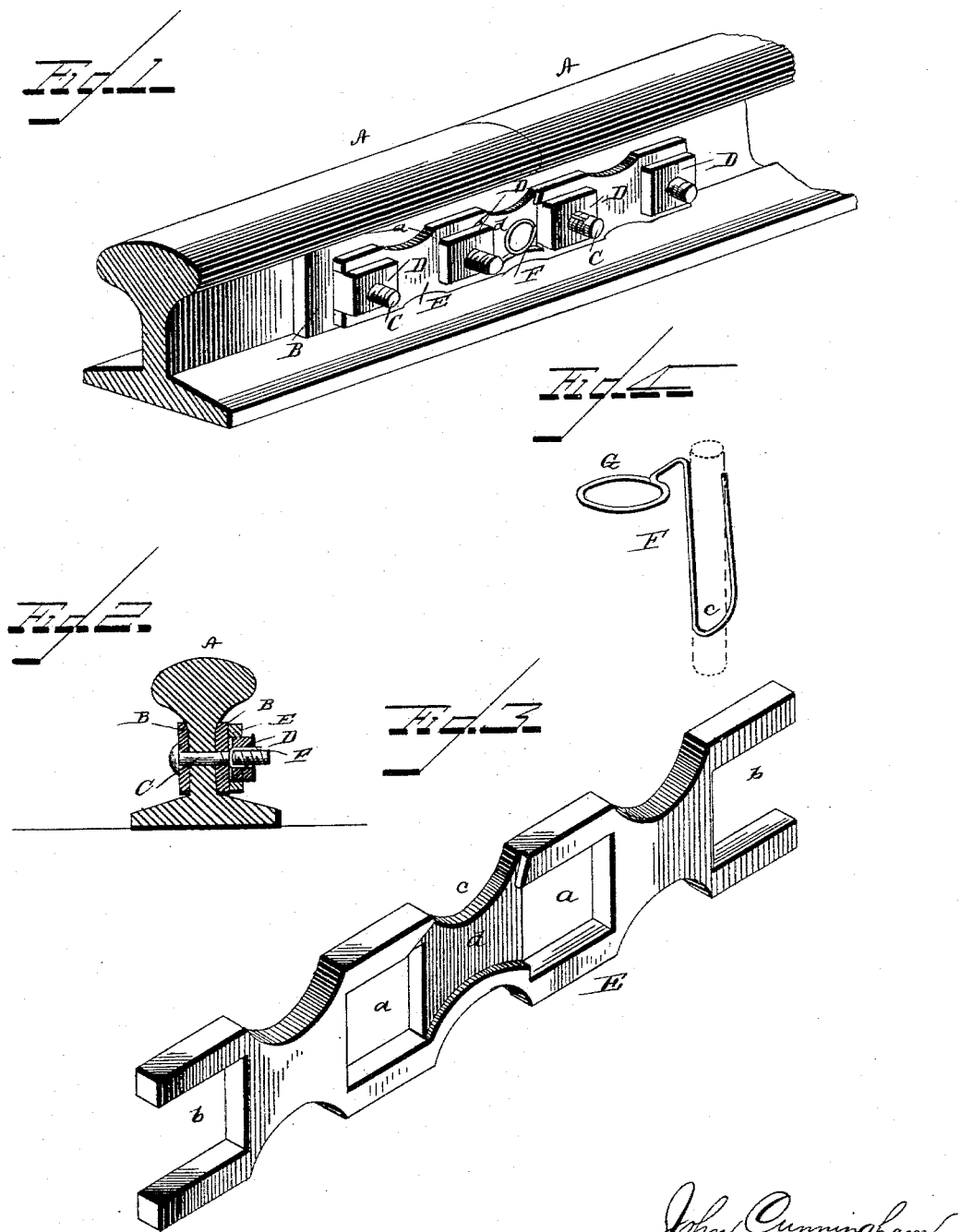
WITNESSES
F. L. Ouraud
J. B. Noyes
INVENTOR
John Cunningham
by
J. R. Littell
Attorney

UNITED STATES PATENT OFFICE.

JOHN CUNNINGHAM, OF HAMPTON JUNCTION, NEW JERSEY.

NUT-LOCK.

SPECIFICATION forming part of Letters Patent No. 325,397, dated September 1, 1885.

Application filed June 30, 1885. (No model.)

*To all whom it may concern:*

Be it known that I, JOHN CUNNINGHAM, a citizen of the United States, residing at Hampton Junction, in the county of Hunterdon and State of New Jersey, have invented certain new and useful Improvements in Nut-Locks, of which the following is a specification.

My invention relates to nut-locks, the object being to provide an improved construction of locking-plate and spring for holding the same against detachment; and, further, to provide a nut-lock which shall be simple in its construction, strong and durable, effective in its operation, and one that can be readily and easly applied.

With these ends in view the invention consists in the combination of two railroad-rails and fish-plates connecting the ends thereof with a locking-plate for engaging the nuts which hold the bolts of the fish-plates in place, and a spring for preventing the detachment or displacement of the locking-plate.

The invention further consists in the improved construction and combination of parts, hereinafter fully described, and pointed out in the claims.

In the drawings, Figure 1 is a perspective view showing the device applied. Fig. 2 is a transverse section; and Figs. 3 and 4 are detail views, respectively, of the locking-plate and spring for holding the same in position.

In the accompanying drawings, in which like letters of reference indicate corresponding parts in the figures, A A represent portions of two railroad-rails, the meeting ends of which are connected by a fish plate or plates, B, through which ends of the rails A A pass bolts C, which are engaged by nuts D for holding them in place.

E represents a locking-bar, which is provided with rectangular openings $a$ for engaging the nuts nearest the meeting ends of the rails. At each end of the locking-bar E is provided a rectangular seat or recess, $b$, which, in addition to engaging the nuts farthest from the meeting ends of the rails to hold the same in place, serves as a wrench whereby the nuts may be tightened in place previous to its adjustment upon the same. The locking-plate E is provided on its outer face, in the space $c$ between the openings $a$, with a seat or recess, $d$, in which is adapted to fit the upper end of a spring, F, for holding the locking bar E in place. The said spring F is formed of a single piece of wire, which is bent at one end at right angles to its body to form a loop, G, which fits in recess $e$, and also provides ready means for removing the spring from engagement with the plate E. The other end of this spring is bent or doubled upon itself, as at $e$, and forms a body approximately U shape in form.

The nuts being placed upon the bolts, they may be tightened by the locking-plate, as before described. Previous to placing the nuts upon the bolts, the body of the spring F is placed inside of one of the nuts, which engages one of the openings $a$, and the nuts tightened. The spring is then lifted to allow the locking-plate to be passed over the same, and after the locking-plate is in position the spring is released and the locking-plate held securely in position.

I claim as my invention and desire to secure by Letters Patent—

1. The combination, in a nut-lock, with the bolts and their nuts, of springs fitting on the bolts and engaged by the nuts, said springs being formed with loops, and a locking-plate having a recess, $d$, substantially as set forth.

2. The combination, in a nut-lock, with the bolts and nuts, of the springs substantially U shape in form and bent at their upper ends to form loops G, and the locking-plate having a recess, $d$, substantially as set forth.

In testimony whereof I affix my signature in presence of two witnesses.

JOHN CUNNINGHAM.

Witnesses:
A. P. SHIVE,
SAMUEL RINEHART.